Dec. 24, 1957  F. A. PEARSON  2,817,264
ELECTROPHORESIS APPARATUS
Filed Oct. 19, 1953  10 Sheets-Sheet 1
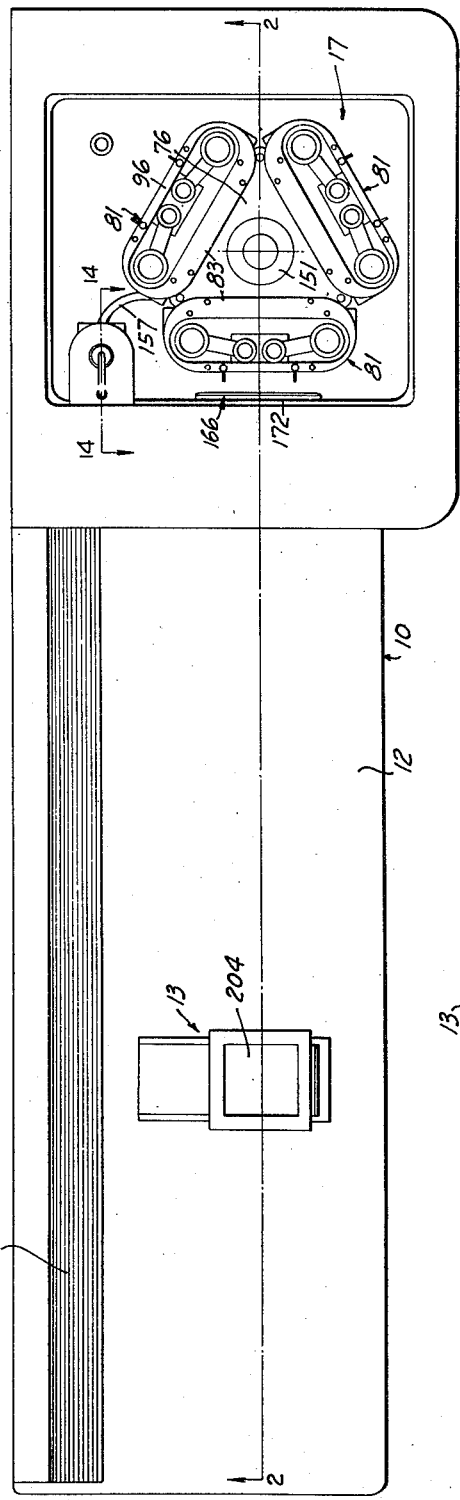
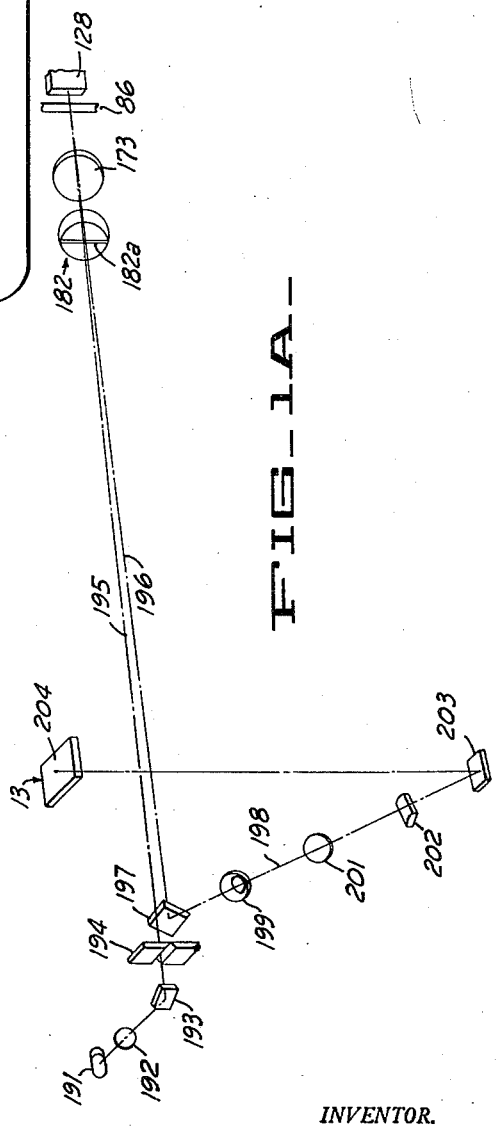
INVENTOR.
Frank A. Pearson
BY
ATTORNEYS

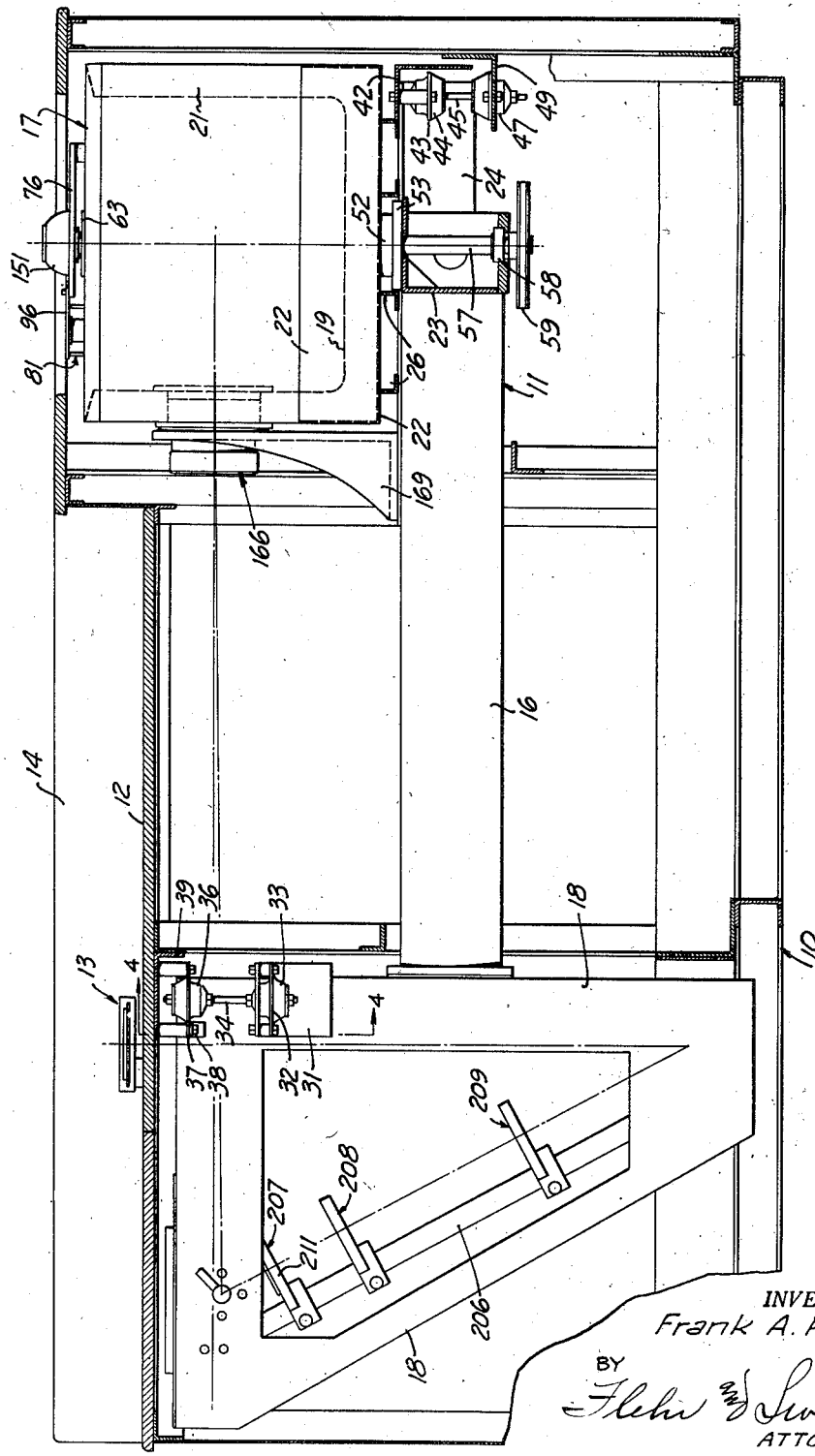

Dec. 24, 1957　　　F. A. PEARSON　　　2,817,264
ELECTROPHORESIS APPARATUS
Filed Oct. 19, 1953　　　10 Sheets-Sheet 3
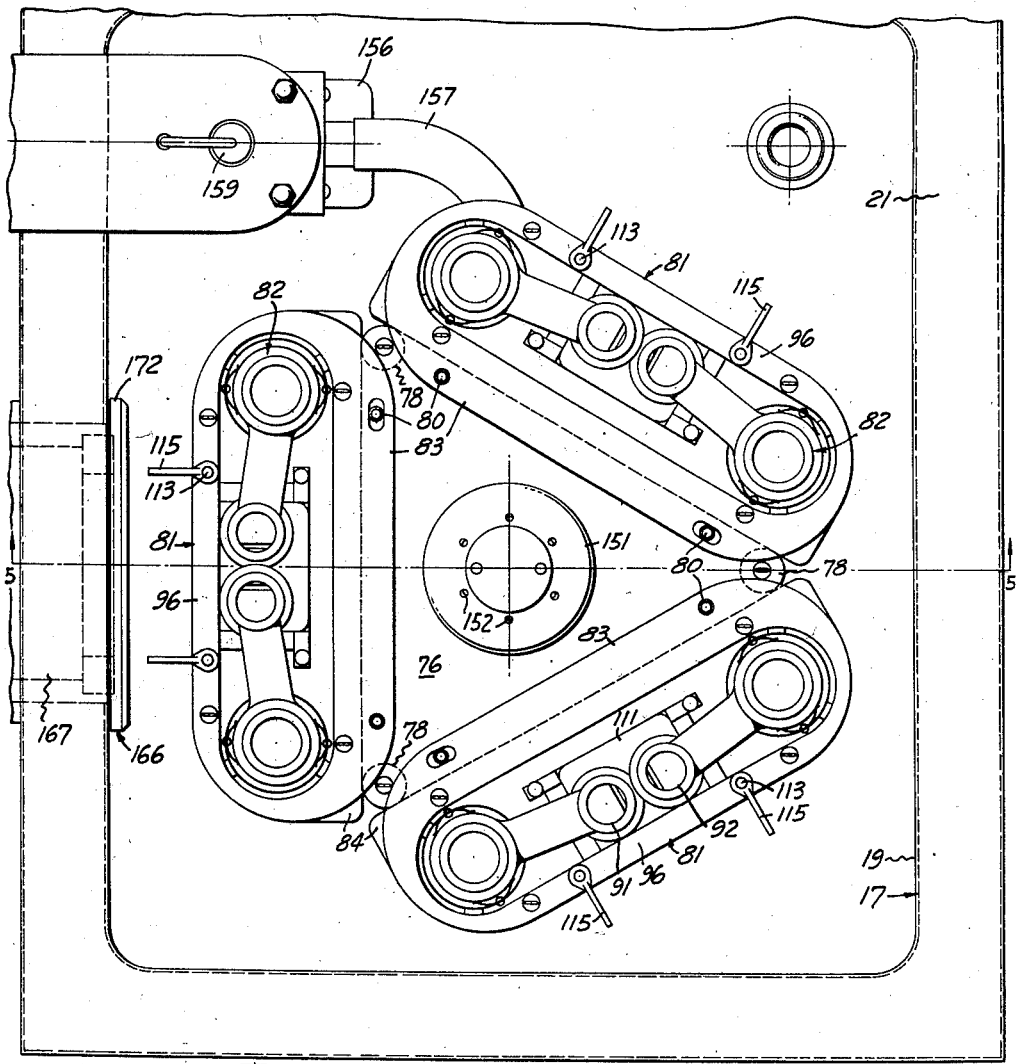
FIG_3_
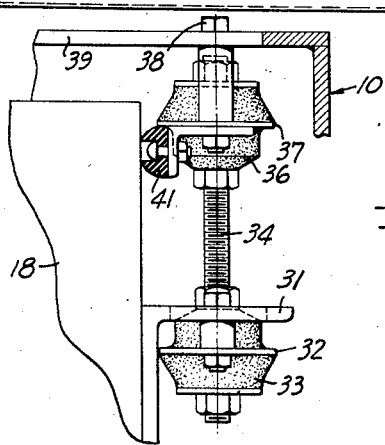
FIG_4_
INVENTOR.
Frank A. Pearson
BY
ATTORNEYS

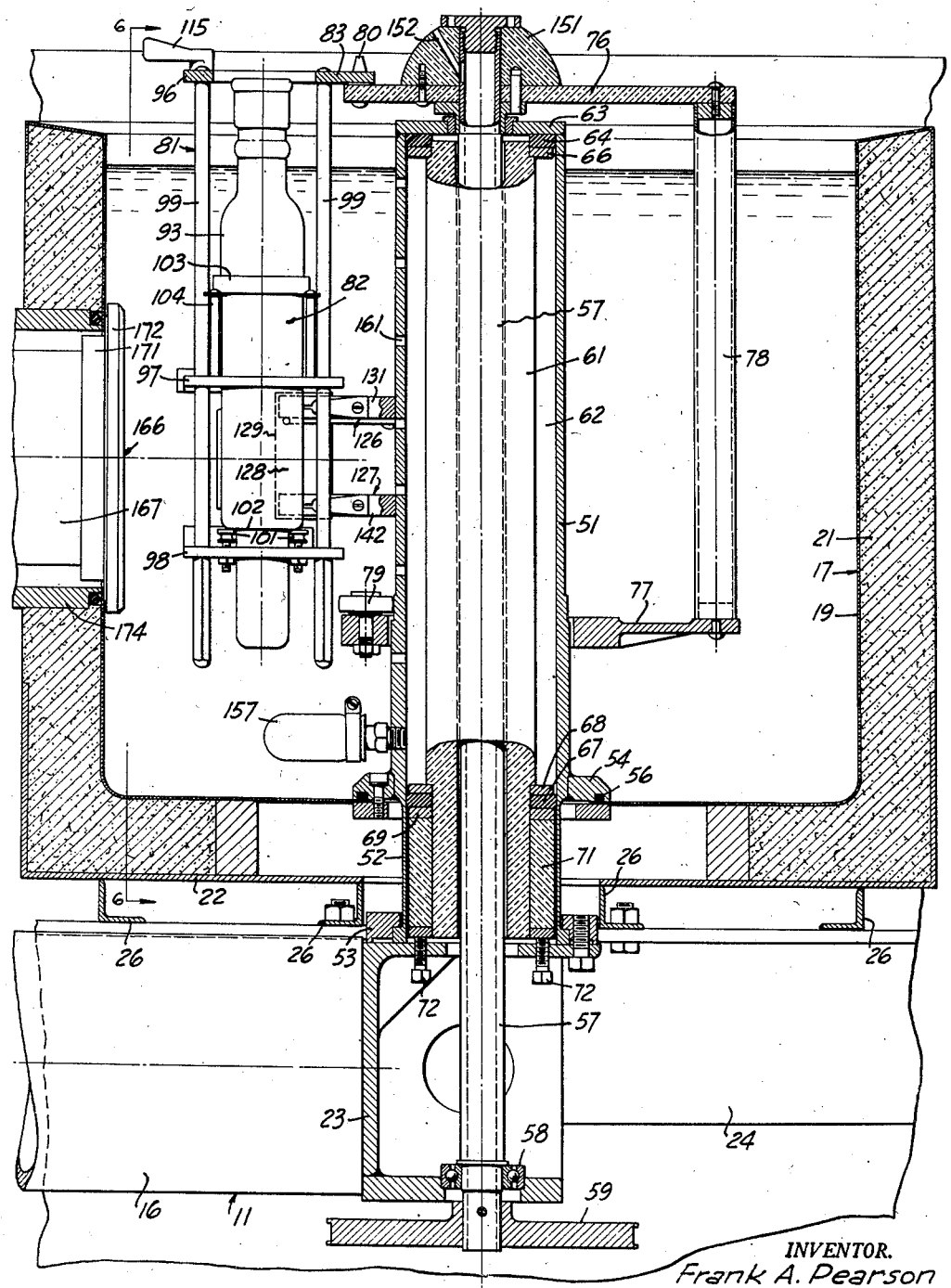
FIG_5_

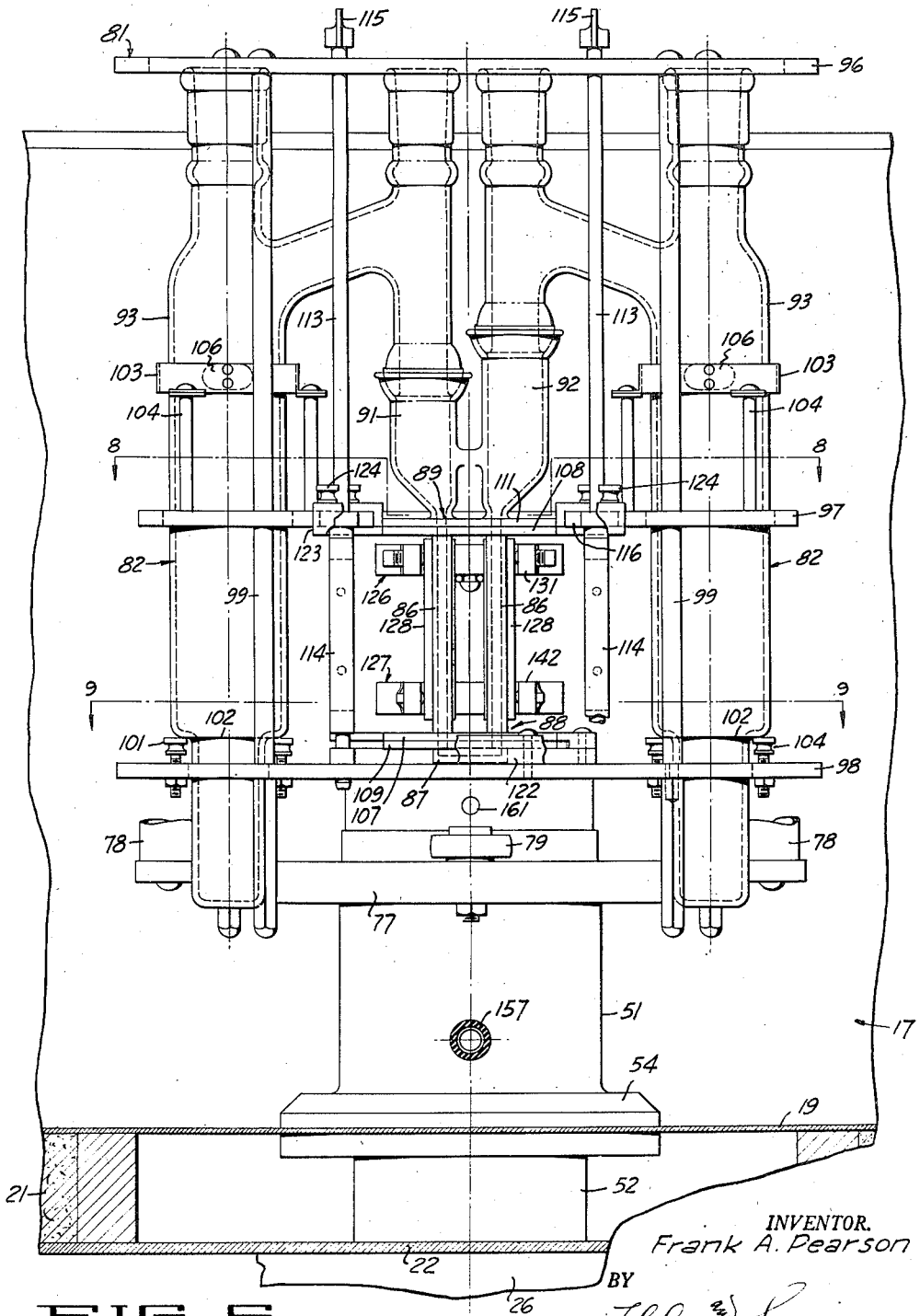
FIG_6_

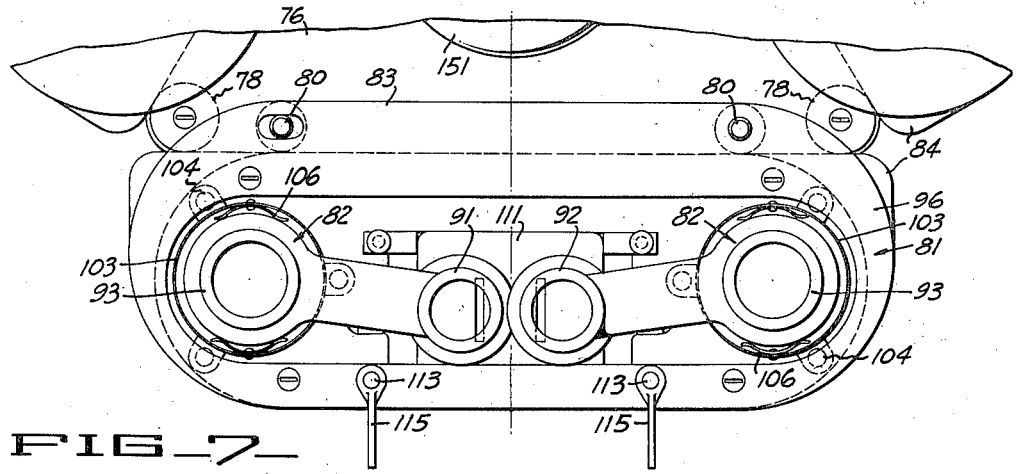
FIG_7_
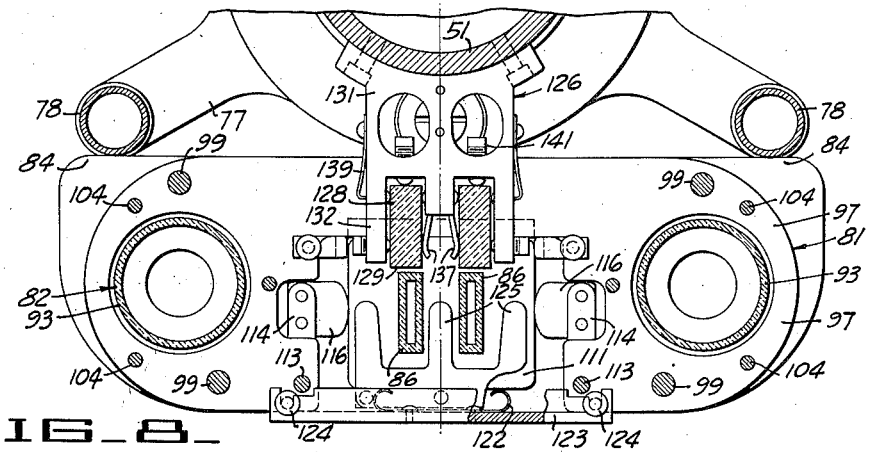
FIG_8_
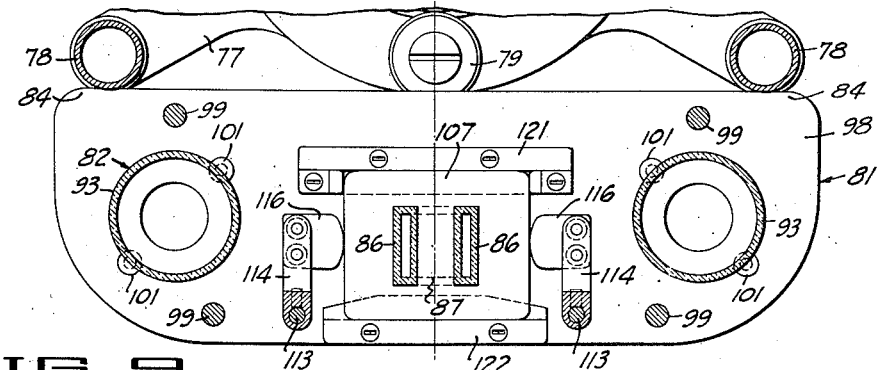
FIG_9_

Dec. 24, 1957 F. A. PEARSON 2,817,264
ELECTROPHORESIS APPARATUS
Filed Oct. 19, 1953 10 Sheets-Sheet 7
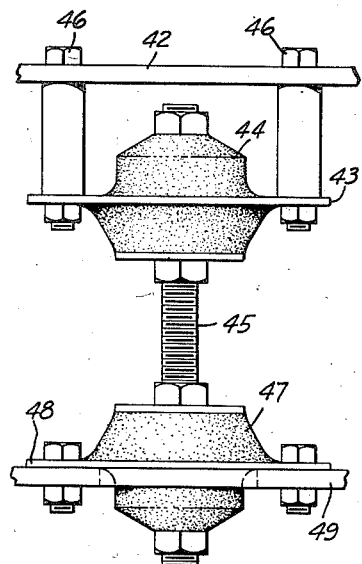
FIG_10_
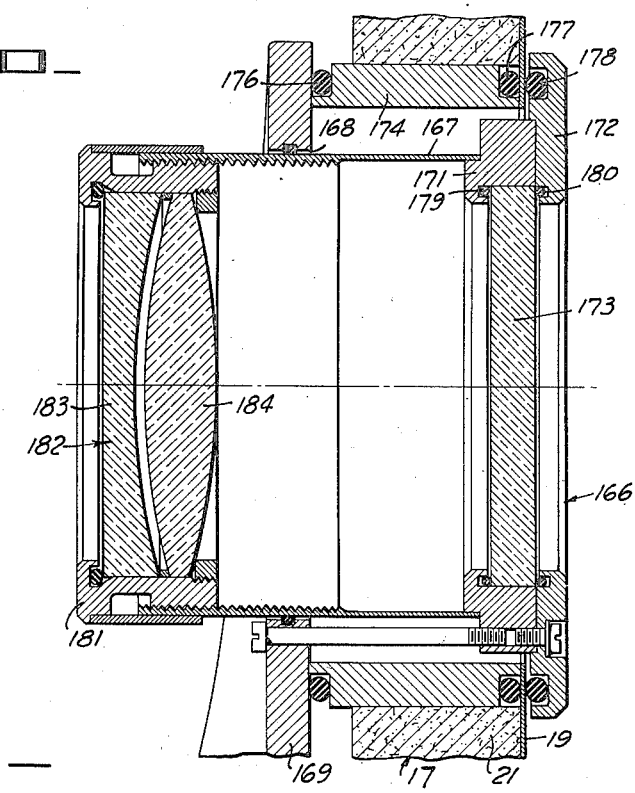
FIG_13_
FIG_11_
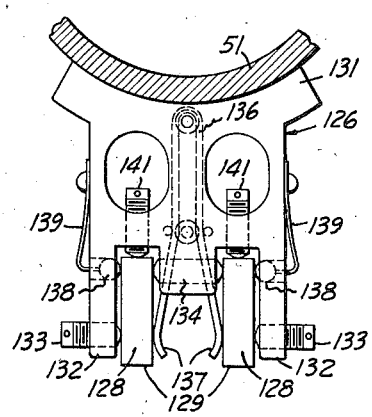
FIG_12_
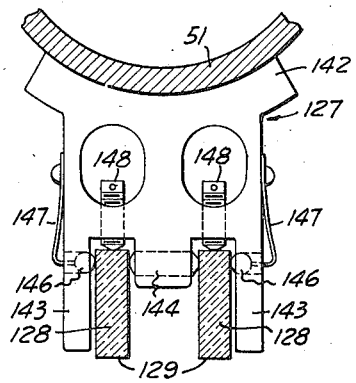
INVENTOR.
Frank A. Pearson
BY
ATTORNEYS

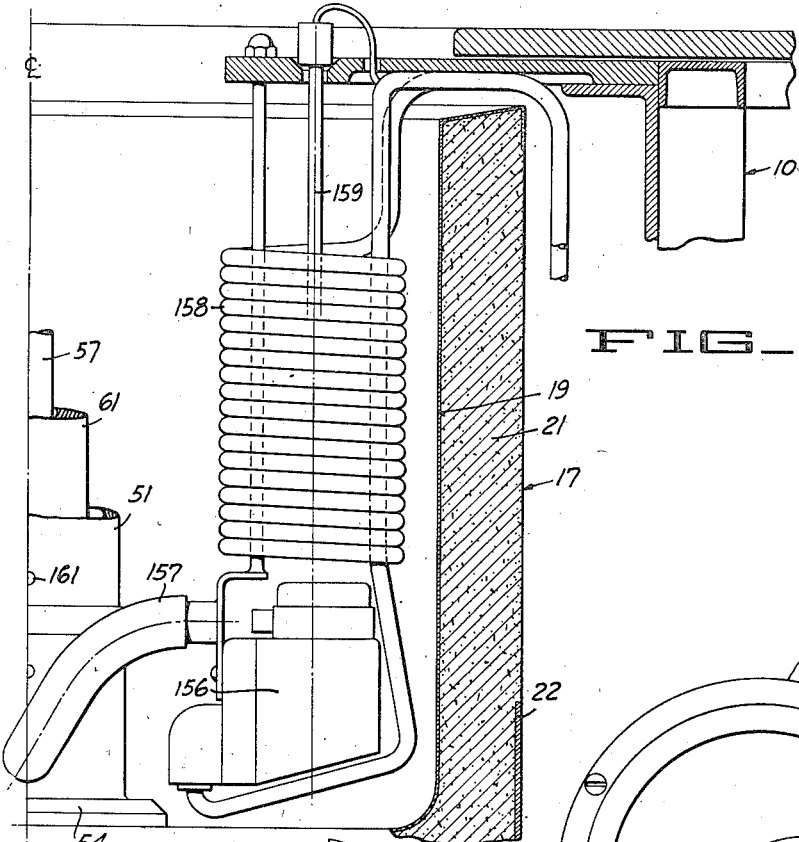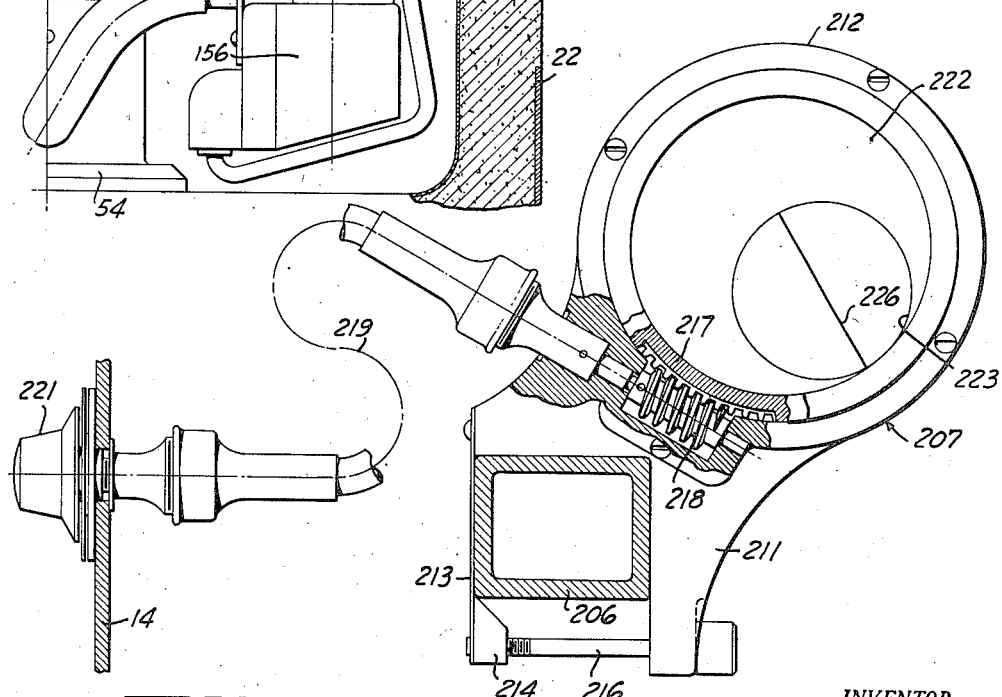

Dec. 24, 1957      F. A. PEARSON      2,817,264
ELECTROPHORESIS APPARATUS
Filed Oct. 19, 1953      10 Sheets-Sheet 9
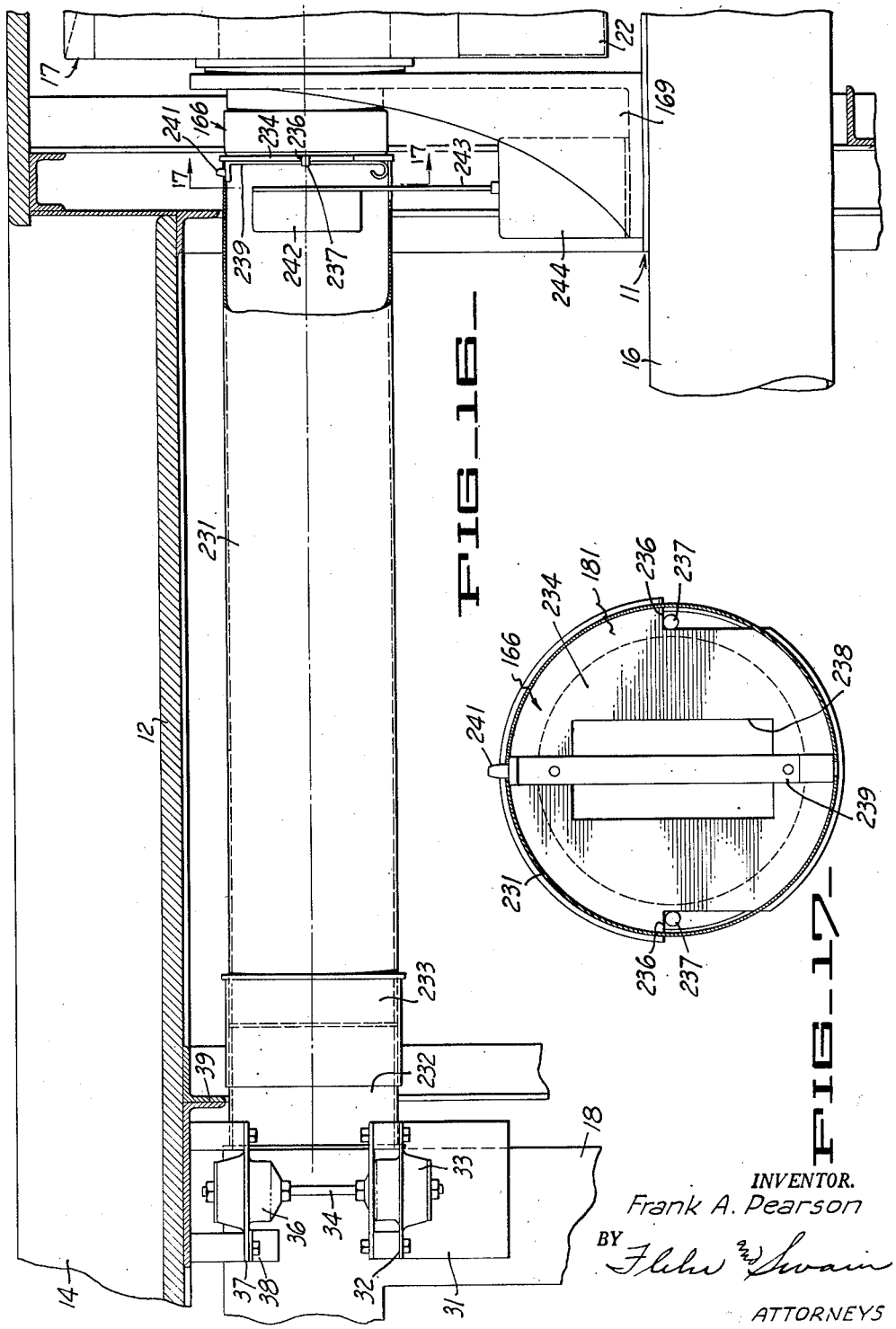
INVENTOR.
Frank A. Pearson
ATTORNEYS

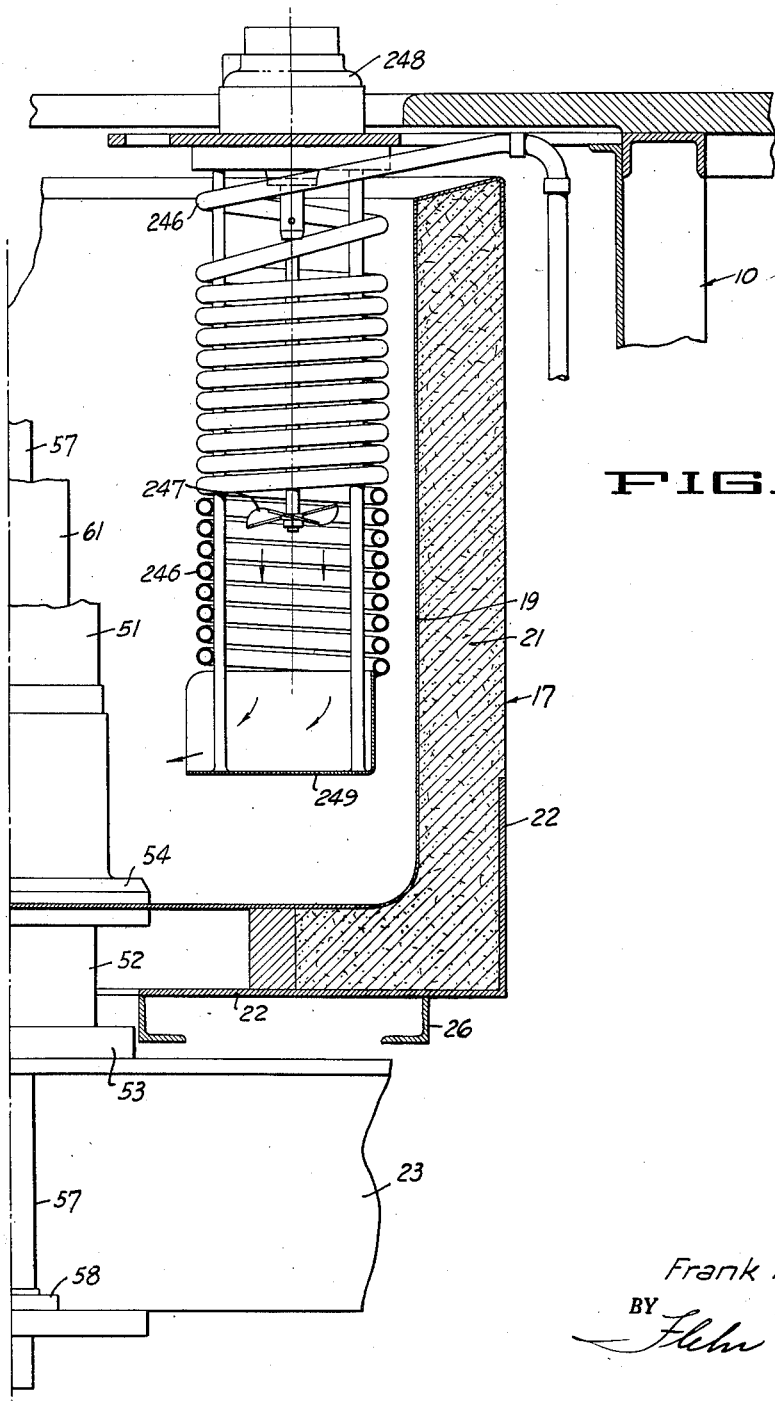

United States Patent Office 2,817,264
Patented Dec. 24, 1957

2,817,264

ELECTROPHORESIS APPARATUS

Frank A. Pearson, Menlo Park, Calif., assignor, by mesne assignments, to Beckman Instruments, Inc., Fullerton, Calif., a corporation of California Application October 19, 1953, Serial No. 386,991

8 Claims. (Cl. 88—14)

This invention relates generally to electrophoresis apparatus suitable for indicating or measuring refractive index variations in various solutions.

Prior types of electrophoresis apparatus employ a cell for containing the sample under observation and which has a transparent limb in which a controlled current is passed through an accurately dimensioned column of the sample solution. An optical system is provided by means of which one may study or make measurements of refractive index variations in the solution. (See Optical Methods in Electrophoresis, Industrial and Engineering Chemistry, volume 18, No. 4, by L. G. Longsworth; Equipment and Experimental Methods for Interference Diffusion Studies, reprinted from The Review of Scientific Instruments 20: 3, 209-215 (1949); and Methods in Medical Research, published by the Year Book Publishers, volume 5 (1952.)) It will be evident that the optical systems required for such apparatus require a high degree of precision for accurate determinations.

Prior types of electrophoresis apparatus available for laboratory and industrial uses have been subject to certain disadvantages. For example, in many instances determinations are made successively with respect to a plurality of samples. With prior apparatus this involves shifting of the samples in such a manner as to disturb the solution columns under observation. Because of the type of optical system employed, the apparatus in many instances has been bulky and has required an excessive amount of floor space. Also, there has been a lack of flexibility in adapting the apparatus for various types of optical tests and determinations.

In general, it is an object of the present invention to provide improved electrophoresis apparatus suitable for use in research and industrial laboratories.

Another object of the invention is to provide electrophoresis apparatus having improved means for moving the cells into operative relation with the optical system.

Another object of the invention is to provide electrophoresis apparatus having an improved optical system which does not require excessive space.

Another object of the invention is to provide apparatus having an improved arrangement and mounting for the various parts whereby the liquid boundaries are not affected by extraneous shocks or vibrations.

Another object of the invention is to provide improved means for maintaining the sample containing cells at a desired temperature level.

Further objects of the invention will appear from the following description in which the preferred embodiment has been set forth in detail in conjunction with the accompanying drawing.

Referring to the drawing:

Figure 1 is a plan view showing apparatus in accordance with the present invention.

Figure 1A is a schematic view illustrating the optical system employed.

Figure 2 is a side elevational view in section taken along the line 2—2 of Figure 1.

Figure 3 is an enlarged plan view showing the tank for maintaining three or more electrophoresis cells in a water bath, and also showing other parts associated with the tank.

Figure 4 is a detail in section illustrating one of the devices for mounting the sub-frame of the machine.

Figure 5 is a side elevational view in section taken along the line 5—5 of Figure 3.

Figure 6 is an enlarged side elevational view, partly in section, and showing one of the electrophoresis cells and the means employed for supporting the same within the water bath.

Figure 7 is a plan view of one of the electrophoresis cells, together with the supporting means for the same.

Figure 8 is a cross-sectional view taken along the line 8—8 of Figure 6.

Figure 9 is a cross-sectional view taken along the line 9—9 of Figure 6.

Figure 10 is a cross-sectional detail illustrating the window for the water bath tank and the Schlieren lens associated with the same.

Figure 11 is a detail partly in section illustrating the mounting means employed for the mirrors.

Figure 12 is a view like Figure 11 but showing the lower portion of the mounting means for the mirrors.

Figure 13 is a side elevational detail illustrating another one of the devices for supporting the sub-frame.

Figure 14 is a detail in section illustrating one form of water circulating and cooling means for the water bath tank.

Figure 15 is a detail partly in section illustrating one form of analyzer for use with the optical system.

Figure 16 is a detail in side elevation and partly in section illustrating bevel means for light passing to and from the Schlieren lens.

Figure 17 is a cross-sectional detail on an enlarged scale taken along the line 17—17 of Figure 16.

Figure 18 is a detail in side elevation and partly in section illustrating modified means for cooling the water bath and for circulating water through the cooling means.

Referring to Figures 1 and 2 of the drawing, the apparatus consists generally of a main rigid frame 10, which is fabricated from suitable structural elements and provided with side walls to form an enclosing cabinet. Within the main frame there is a sub-frame 11 which serves to carry the main operating parts of the machine, and which is secured to the main frame by shock-absorbing means as will be presently described. The top 12 of the cabinet is shown provided with a holder 13 for a viewing screen or a photographic plate. An instrument panel 14 is shown extending upwardly from the rear of the cabinet and may serve to mount various instruments and control devices (not shown).

The sub-frame 11, because of its shaping, can be referred to as one of the "banjo type." It consists of a rigid horizontal strut 16 which can be in the form of a steel pipe, and which is attached at its one end to structural members forming a mounting for the water tank 17. At its other end the strut 16 is attached to the casing 18, which forms mounting means for certain of the optical elements.

Figures 3 and 5 illustrate the water tank 17, and the members for mounting the tank upon the frame strut 16. The tank consists of an inner metal liner 19, formed of non-corrodible material, and the layer 21 of heat insulating material. The lower part of the tank is enclosed within the exterior metal shell 22. The strut 16 is attached to the cross member 23, which in turn is attached to structural members 24 that extend parallel to and alongside the strut 16. The framing formed by structure members 23 and 24 serve to mount the tank supporting members 26.

The means employed for providing a shock absorbing connection between the main and sub-frames are illustrated in Figures 2, 4, and 13. Thus a bracket 31 is secured to each side of the casing 18, and is attached to a plate 32 which is bonded to the resilient rubber member 33. Member 33 is attached to the lower end of the rod 34, which carries another resilient member 36 at its upper end. A plate 37, which is bonded to the resilient rubber member 36, is attached by bolts 38 to the main frame structural member 39. Resilient rubber buffers 41 are shown carried by the plates 37, and serve to limit side movement of the casing 18. With the arrangement just described the casing 18 is carried entirely by the resilient rubber members 33 and 36, and these members cushion shocks applied to the main frame, thus minimizing transmission of such shocks to the sub-frame.

Cushioning means for that end of the sub-frame nearest the tank 17 are shown in Figures 2 and 13. Thus a plate 43 is bonded to the resilient rubber member 44, and is attached by bolts 46 to the structural member 42 of the sub-frame. A rod 45 has its upper end bonded to the member 44 and its lower end bonded to a similar rubber member 47. A plate 48 bonded to member 47, is attached to the member 49, which is a structural part of the main frame.

The tank 17 is provided with means for mounting a plurality of cells, whereby these cells can be rotated to successively bring their light transparent limbs into cooperative relation with the optical system. The particular arrangement illustrated in the drawing includes a vertical post 51, which is hollow and which has a lower end portion 52 of reduced diameter extending through the bottom wall of the tank, and attached by flanged mounting ring 53 to the structure member 23. Leakage between the post and the tank liner 19 is prevented by suitable means such as the flange 54, which is sealed with respect to the liner by the resilient O-ring 56. A drive shaft 57 extends upwardly through the post 51, and is journaled at its lower end by suitable means such as the ball bearing assembly 58. A pulley or gear 59 is shown attached to the lower end of the shaft 57, and is connected to suitable motive means (not shown) whereby the shaft 57 can be smoothly started and turned in one direction or the other. A stationary tube 61 surrounds the shaft 57 and is preferably formed of suitable non-metallic material, such as a phenol-formaldehyde product. In the embodiment of Figures 5 and 14 the space 62 between the tube 61 and the post 51 serves to convey circulating water as will be presently explained.

The upper end of the post 51 is provided with a closure 63 through which the upper end of the shaft 57 extends. The upper end of the tube 61 is sealed with respect to the post by suitable means such as the seal ring 64 of resilient material (e. g. soft rubber). The seal ring can be compressed between the end closure 63 and a thrust washer 66 carried by the upper end of tube 61.

A seal ring 67 of suitable resilient material (e. g. soft rubber) similarly forms a seal between the lower end portion of the tube 61 and the post 51. This seal ring can be squeezed between the metal washers 68 and 69. Washer 68 engages a shoulder on the tube 61, and washer 69 is engaged by the upper end of the thrust collar 71. Upward force can be applied to the thrust collar 71 by the set screws 72. It will be evident that tightening set screws 72 serves to increase the squeezing pressure applied to both the resilient seal rings 67 and 64.

A plate 76 is fixed to the upper end of shaft 57, and is attached at spaced points to the lower guide spider 77, by the vertical rods or tubes 78. The spider 77 is apertured to accommodate the post 51 and is provided with post engaging rollers 79.

Assuming that it is desired to support three cells, the plate 76 is generally triangular, as viewed in plan (Figure 3), and is provided with three sets of studs 80. These studs 80 are adapted to engage and retain the racks 81, which carry the sample cells 82. The upper end of each rack is provided with a flange 83 which is apertured to accommodate the studs 80. The lower portions 84 of each rack are adapted to abut the rods or tubes 78, whereby each rack is held in vertical position, and is caused automatically to assume a predetermined position as it is lowered into the tank and engaged with the studs 80.

The specific construction of the racks may vary in accordance with the particular type of cell employed. The particular cell illustrated in Figure 6 is a modified Tiselius type sold under the trade-name of Pyrocell, and consists of limbs 86 which are formed of transparent walls, and which provide vertical passages or columns of predetermined dimensioning. The lower ends of the limbs 86 are in communication through the cross-connecting limb 87. The upper ends of the limbs communicate with the solution containing tubes 91 and 92. These tubes are connected to the side tubular vessels 93.

Each of the racks 81 in this instance consist of the upper member 96, which is extended to form the flange 83, an intermediate plate 97, and a lower plate 98. These plates are apertured to accommodate the sample cell and are inter-connected by the spacer rods 99. To facilitate accurate positioning of each cell, plate 98 can be provided with the adjustable abutment shoulders 101, which engage the shoulders 102, formed on the side vessels 93. The side vessels can be embraced by the retaining rings 103, which are connected to the intermediate plate 97 by the rods 104, and which are provided with spring fingers 106 (Figure 7) for engaging the adjacent side walls of the vessels 93, and for centering these vessels and frictionally retaining the same.

The lower and upper ends of the limbs 86 are attached to the apertured and parallel plates 107 and 108, which have sealed slidable contact with the cooperating plates 109 and 111, which are attached respectively to the tubes 91 and 92, and to the cross-connecting limb 87. Rotatable rods 113 extend downwardly through the plates 96, 97 and 98, and are provided with operating arms 114. These arms carry nudging pads 116 (Figures 8 and 9) which engage the edges of the plates 107 and 108. Upon manually turning the upper ends 115 of the rods 113, it will be evident that plates 107 and 108 can be shifted a limited distance in one direction or the other, in order to facilitate loading of the cell and formation of the liquid boundaries.

The lower plate 107 is shown being guided for lateral movement by the guide members 121 and 122 (Figure 9) which are carried by the plate 98. The upper plate 108 is shown similarly guided by the spring fingers 122, which are carried by the bar 123. This bar is removably clamped in place by the thumb nuts 124. Also plate 111 is urged downwardly by the spring fingers 125.

Means are provided for mounting a mirror alongside each transparent limb 86. Preferably the mounting means is carried by the post 51, and can be constructed as illustrated in Figures 5, 8, 11 and 12. Thus upper and lower mounting assemblies 126 and 127 are provided, which are fixed to the post 51, and which serve to carry the two mirrors 128. The planar edge faces 129 of these mirrors form the reflecting surfaces which are disposed adjacent the transparent limbs 86. The upper assembly (Figure 11) includes the bracket 131, which carries elements engaging the mirrors 128 to accurately locate them in fixed position, and to enable quick removal and replacement of the mirrors as desired. Thus the side bracket extensions 132, which extend alongside the mirrors 128, carry the adjustable set screws 133, and the fixed locating pads 134. A hairpin type wire spring 136 is carried by the bracket 131, and has its branches 137 engaging the inner surfaces of the mirrors. The mirrors are urged against the pads 134 by the balls 138, which are urged by the leaf springs 139. The adjustable set screws 141 engage the rear edges of the mirrors. The mirrors are of such character that they can be immersed without corrosion or other deterioration.

The lower bracket 142 (Figure 12) is similarly provided with side extensions 143, and with locating pads 144. The balls 146, corresponding to the balls 138 for the upper bracket, are urged against the mirror by the leaf spring 147. Adjustable set screws 148 engage the rear edges of the mirrors.

With the mounting means described above, the mirrors 128 can be removed without changing any of the elements which serve to position the mirrors, and when the mirrors are re-applied they are automatically located approximately in proper position for cooperating with the transparent limbs of the cells. The adjustments provided make it possible to fix the mirrors in accurate alignment with the optical system, and in accurate relation with the limbs of the various cells, as these cells are moved into position for observation.

When in use each of the cells is provided with terminal electrodes which connect with electrical circuit means. The insulating hub or cap 151 at the top of the shaft 57, is shown provided with a plurality of openings 152, through which leads (not shown) can extend from the electrodes (not shown) which are associated with the several cells. These leads extend downwardly through the shaft 57 to make connection with the circuit. As is well known by those familiar with electrophoresis methods, the electrical circuit is provided with control means whereby current of a predetermined constant value can be applied to the cells containing the samples under observation.

Normally the tank contains sufficient water (or aqueous solution) to substantially completely immerse the cells, and means is provided to maintain the water at a constant temperature as for example about 1 to 2° C. As a part of the cooling and temperature control system, an electrical motor-pump unit 156 is mounted within the tank, and has its inlet side connected by tubing 157 with the lower portion of passage 62 (Figure 5). A cooling coil 158, formed of suitable metal tubing, is arranged above the pump 156, and is connected by tubing to an external refrigerating system, whereby a refrigerant is continuously circulated through the coil as required. The inlet passage to the pump 156 is disposed axially to the coil 158, whereby water is drawn downwardly through the coil before entering the pump. A temperature control element 159 is immersed in the water bath, and serves to control the external means provided for supplying refrigerant to the coil 158. The control serves to maintain the temperature of the water bath at a constant level. The side walls of the post 51 are in this instance provided with a plurality of apertures 161 whereby water introduced into the passage 62 from the pump is delivered laterally from the post 51 to circulate about the cells and particularly about the limbs 86.

A part of the optical system includes a lens window assembly 166 which is mounted on one side of the tank. This assembly includes a barrel 167 which is disposed in an opening 168 in the vertical bracket 169. The ring and flange members 171 and 172 are fitted to the inner end of the barrel 167, and form a sealed mounting for the transparent window 173. A spacing collar 174 is inserted through the insulating material 21, and is sealed with respect to plate 169 and the tank liner 19, by suitable means such as the resilient O-rings 176 and 177. Another O-ring 178 forms a seal between the liner and the flange member 172. The window is similarly sealed by the resilient seal rings 179 and 180, which may be of the O-ring or wedge ring type. A lens mounting 181 is threaded into the barrel 167, and carries a suitable lens system 182, such as the concave and convex spherical lenses 183 and 184. The space between the lens system 182 and the window 173 is isolated from surrounding atmosphere and can be dried or dehydrated whereby it is possible for the window 173 to be at a low refrigerated temperature without causing accumulation of frost or condensate upon its outer surface.

It is desirable to tilt the lens system a slight amount from horizontal, as for example, about $1/16$ inch over a 5 inch diameter to prevent troublesome back reflections.

Figure 1A schematically illustrates the optical system which can be employed. The light source employed consists of the lamp 191, the focusing lens 192, and the reflecting mirror 193 which directs the light toward the slit forming device 194. The narrow entrance beam of light from the slit is indicated at 195, and passes through the lens system 182, the tank window 173, and the cell limb 86, to be reflected by the mirror 128. The reflected emergent beam 196 is at a slight angle to beam 195 and in a region near the slit 194, there is a mirror 197 which deflects the beam 196 laterally as indicated at 198.

The deflected beam 198 may be projected through several optical devices, including in this instance an analyzer 199, a camera lens 201, and a cylindrical lens 202. The beam from lens 202 can be reflected by mirror 203 to the photographic plate 204 or viewing mirror in holder 13. The lens system 182 functions as a Schlieren lens. The analyzer may include a diagonal slit, wire, bar, or like known device for obtaining various Schlieren patterns. The arrangement is such that the light beam 195 is collimated by the Schlieren lens 182, just before it enters the water bath. The collimated light passes through one limb of the electrophoresis cell and is then reflected for passage through the cell near its original path, by the cell mirror 128. The reflected light passes through the Schlieren lens 182, which so converges it that it forms an image of the slit in the proximity of the slit forming device 194. Just before reaching this image forming position, the light is deflected by the mirror 197.

All of the parts of the optical system are carried by the sub or banjo frame. The illuminating lamp 191, lens 192, mirror 193, slit device 194, mirror 197, analyzer 199, lens 201, lens 202, and mirror 203, are mounted within the rigid casing 18. An inclined bar 206 can be mounted within the casing 18 and can carry certain optical elements. Thus mountings 207, 208, and 209 are shown adjustably clamped on the bar 206, and can serve to carry the analyzer 199, the lens 201, and the cylindrical lens 202.

A preferred construction for the analyzer mounting 207 is illustrated in Figure 15. It consists of an arm 211 which is notched to accommodate the bar 206, and which is formed to provide the ring 212. A spring clamping strip 213 is secured to the arm 211 and engages one side of the bar 206. The free end of the clamping strip is provided with a nut 214, which is engaged by the threaded end of the clamping screw 216. When the clamping screw is removed the entire mounting can be removed or applied to the bar 206. A ring gear 217 is rotatably fitted in the annular portion 212, and is engaged by the rotatable worm 218. The shaft of this worm is coupled to a flexible shaft 219, which is shown extending through the operating knob 221 on the instrument panel 14. The ring gear 217 carries a removable plate 222. Normally the removable plate 222 will carry a bar, knife edge, slit, or a wire 226, to secure a desired Schlieren pattern. By turning the ring gear 217, the angularity of this wire, bar, knife edge, or slit can be adjusted, and also shifted with respect to the axis of the optical system.

An optical system of the type described above, which involves use of two cell limbs and transmission of light twice through each limb, is subject to the formation of ghost images. I have found that ghost images can be eliminated by providing a masking strip 182a on the Schlieren lens 182. This mask extends parallel to the limbs of the cell and is of a width dependent upon the spacing between the limbs. Thus in one particular instance where the distance between the limbs was 24 millimeters, I employed a masking strip $5/8$ inch in width, and extending diametrically across the face of the lens 182.

As shown in Figures 16 and 17 it is desirable to provide a baffle for the light beams passing to and from the Schlieren lens. Thus I can provide a light metal conduit 231, one end of which can be coupled to the hood 232 by the slidable sleeve 233. The other end of the conduit is loosely attached to the lens 166. The means for this purpose can include the light mask 234, which has side shoulders 236 for support on the studs 237, the latter being carried by the lens. The rectangular mask opening 238 is bisected by the strap 239 which functions as the mask strip 182a. The upper end of strap 239 carries a pin 241 adapted to be loosely accommodated in an opening formed in the adjacent part of the conduit 231.

Figures 16 and 17 also show a light intercepting flag 242 in front of the lens and which can be positioned to intercept light from either one of the two limbs of the cell. This flag is shown mounted on the vertical rod 243. The rod connects with the electrical motive means 244 whereby by means of suitable control circuits, the flag can be positioned in either one of two light intercepting positions, i. e. to intercept light passing on either side of strap 239.

Figure 18 shows modified means for circulating and cooling the tank bath. The holes 161 in post 51 are omitted, together with the hose connection 157. The refrigerant is circulated through the coil 246, and water is circulated into and down through this coil by the agitator 247, which is driven by the upper motor 248. At the lower end of the coil there is a sheet metal shoe 249 having one open side, and which directs water laterally.

It will be evident from the foregoing that I have provided an electrophoresis apparatus having many desirable features. In general, the amount of floor space required for the equipment is not excessive, due largely to the character of the optical system. The auto collimation provided by virtue of light reflection back through the same limb, greatly shortens the apparatus and doubles its sensitivity. Because of the rotary motion employed to move the cells into and out of alignment with the optical system, the cells can be started and stopped smoothly without abrupt or sudden jerky action, thus minimizing disturbances of the solution in the limbs. Also this arrangement conserves space and simplifies remote control. The cells are automatically positioned for proper alignment when they are engaged with the rotary support means, and the mirrors used in conjunction with the cells maintain their adjustment, because they are mounted upon a fixed supporting means, rather than upon the cells.

The apparatus is flexible in its adaptation to various types of tests, observations and measurements. In addition to its use for producing Schlieren patterns, minor changes and additions can be used to operate according to the "concentration fringe" or the "Gouy" fringe methods. Such methods are explained in the last two of the previously cited publications.

I claim:

1. In electrophoresis apparatus of the type utilizing a plurality of electrophoresis cells each having a transparent limb adapted to contain solution, a water bath tank, a fixed vertical post disposed within said tank, a rotatable shaft extending through the post, means on said shaft serving to support the plurality of said cells, mirrors carried by said post and positioned adjacent the transparent limbs of said cells, a window in one side wall of the tank, a light source exterior of the tank for projecting a beam of light through said window and through a transparent limb of a cell, whereby said light beam is reflected back through said limb, and said window, the reflected beam being on an axis at a slight angle to the projected beam, a mirror for deflecting the reflected beam in a direction laterally of the projected beam, and means for analyzing the deflected beam to indicate refractive index variations of the solution in said limb, rotation of said shaft serving to successively bring electrophoresis cells into operative relation with the projected and reflected beams.

2. Apparatus as in claim 1 in which two mirrors are provided whereby either one of two transparent limbs of each cell can be brought into operative relation with the projected light beam.

3. Apparatus as in claim 1 together with refrigerating means for maintaining the liquid within the tank at a constant temperature.

4. In electrophoresis apparatus of the type utilizing a plurality of electrophoresis cells having transparent limbs adapted to contain solution, a water tank, a fixed vertical post disposed within said tank, a rotatable shaft extending through the post, means attached to the upper end of the said shaft for supporting a plurality of electrophoresis cells circumferentially spaced about the post, liquid pumping means for circulating liquid through said tank, heat exchange means for maintaining the liquid at a desired constant temperature, mirrors carried by said post and positioned adjacent the transparent limbs of said cells, a window in one side wall of the tank, a light source exterior of the tank for projecting a beam of light through said window and through the transparent limb of a cell, whereby said light beam is reflected back through said limb and said window by the mirror adjacent the limb, the reflected beam being on an axis at a slight angle to the projected beam, a mirror for deflecting the reflected beam in a direction laterally of the projected beam, and means for analyzing the deflected beam to indicate refractive index variations and refractive index gradients of the solution in said limb, rotation of said shaft serving to successively bring electrophoresis cells into operative relation with the projected and reflected beam.

5. In electrophoresis apparatus of the type utilizing an electrophoresis cell having a transparent limb adapted to contain solution, a water bath tank serving to enclose said cell, an optical system for indicating refractive index variations in the solution within the transparent limb of said cell, said system including a mirror within the tank and disposed adjacent said transparent limb, and a window mounted in one wall of the tank, said optical system also including a light source for projecting a narrow beam of light through said window and through said transparent limb, whereby the projected light beam is reflected by the mirror back through the transparent limb and window, said optical system also including means exterior of said tank for indicating the refractive index variations in the solution within the transparent limb, a rigid sub-frame upon which said tank and elements of the optical system are mounted, a main frame, and means forming a shock absorbing mounting for the sub-frame upon the main frame.

6. In electrophoresis apparatus of the type utilizing electrophoresis cells having a transparent limb adapted to contain solution, a tank comprising a water bath for the cells, means within the tank serving to support a plurality of said cells, said means being rotatable about a vertical axis, a reflecting mirror disposed adjacent one side of said transparent limb, a window in one side wall of the tank, and means disposed exterior said tank forming an optical system together with said mirror, said optical system indicating refractive index gradients in the solution within said limb and serving to project a beam of light through the window and through the transparent limb whereby a reflected light beam passes back through the transparent limb and said window.

7. In electrophoresis apparatus of the type utilizing an electrophoresis cell having two adjacent transparent limbs adapted to contain solution, a water bath tank serving to enclose said cell, an optical system for indicating refractive index variations in one transparent limb of said cell, said system including a mirror within the tank and disposed adjacent said transparent limbs, and a window mounted in one wall of the tank, the optical system including a lens adjacent the exterior side of said window and a light source for projecting a beam of light through said lens and window and through said one of said transparent limbs whereby the projected light beam is reflected by said mirror back through said one limb and said window and lens, the optical system also including means exterior of the tank for indicating refractive index variations in the solution within the transparent limb under observation, masking means disposed adjacent said lens serving to minimize the extraneous reflections from objects adjacent the transparent limb under observation and from various surfaces of the lens, and a light intercepting flag adapted to be moved in either one of two operating positions to enable the obtaining of indices from one limb or the other.

8. In electrophoresis apparatus of the type utilizing an electrophoresis cell having two adjacent transparent limbs adapted to contain solution, a water bath tank serving to enclose said cell, an optical system for indicating refractive index variations in one transparent limb of said cell, said system including mirrors within the tank and disposed adjacent said transparent limbs, a window mounted in one wall of the tank, an optical system including a lens adjacent the exterior of said tank and said window and a light source for projecting a beam of light through said lens and window and through one of said transparent limbs whereby the projected light beam is reflected by one of said mirrors back through said one limb and said window and lens, the optical system also including means exterior of said tank for indicating refractive index variations in the solution within said transparent limb, and a light intercepting flag adapted to be moved in either one of two operating positions to enable the obtaining of indices from one limb or the other.

References Cited in the file of this patent

UNITED STATES PATENTS

| | | |
|---|---|---|
| 2,253,581 | Reynolds | Aug. 26, 1941 |
| 2,362,235 | Barnes | Nov. 7, 1944 |
| 2,412,602 | Chambers et al. | Dec. 17, 1946 |
| 2,495,297 | Stern | Jan. 24, 1950 |
| 2,630,042 | Sheffer et al. | Mar. 3, 1953 |
| 2,762,254 | Kegeles | Sept. 11, 1956 |